EX1 [illegible]

BEST AVAILABLE COPY

Dec. 28, 1954 W. H. GILLILAND ET AL Re. 23,915

HIGH-VOLTAGE SWITCH ASSEMBLY

Orig. 2575,707

Original Filed Jan. 9, 1950 5 Sheets-Sheet 1

INVENTOR

WILLIAM H. GILLILAND
FITZHUGH H. TURNHAM

BY Strauch, Nolan & Viggiano
ATTORNEYS

Dec. 28, 1954 W. H. GILLILAND ET AL Re. 23,915

HIGH-VOLTAGE SWITCH ASSEMBLY

Original Filed Jan. 9, 1950 5 Sheets-Sheet 2

INVENTOR
WILLIAM H. GILLILAND
& FITZHUGH H. TURNHAM

BY Strauch, Nolan & Diggins
ATTORNEYS

HIGH-VOLTAGE SWITCH ASSEMBLY

Original Filed Jan. 9, 1950 5 Sheets-Sheet 3

INVENTOR
WILLIAM H. GILLILAND
& FITZHUGH H. TURNHAM

BY Strauch, Nolan & Diggins
ATTORNEYS

HIGH-VOLTAGE SWITCH ASSEMBLY
Original Filed Jan. 9, 1950 5 Sheets-Sheet 4
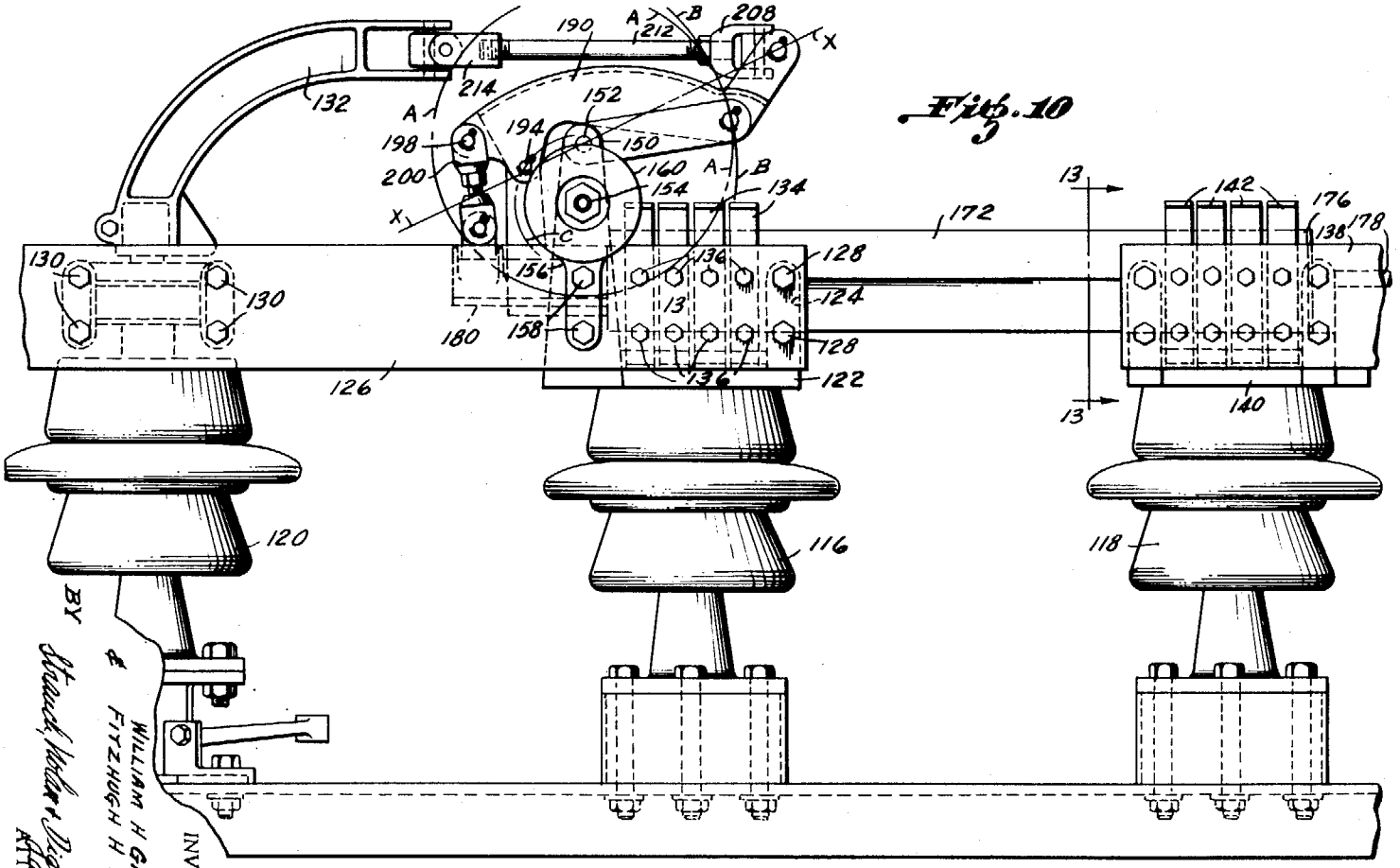
INVENTOR
WILLIAM H GILLILAND
& FITZHUGH H TURNHAM
BY Strauch, Nolan & Diggins
ATTORNEYS HIGH-VOLTAGE SWITCH ASSEMBLY
Original Filed Jan. 9, 1950 5 Sheets-Sheet 5
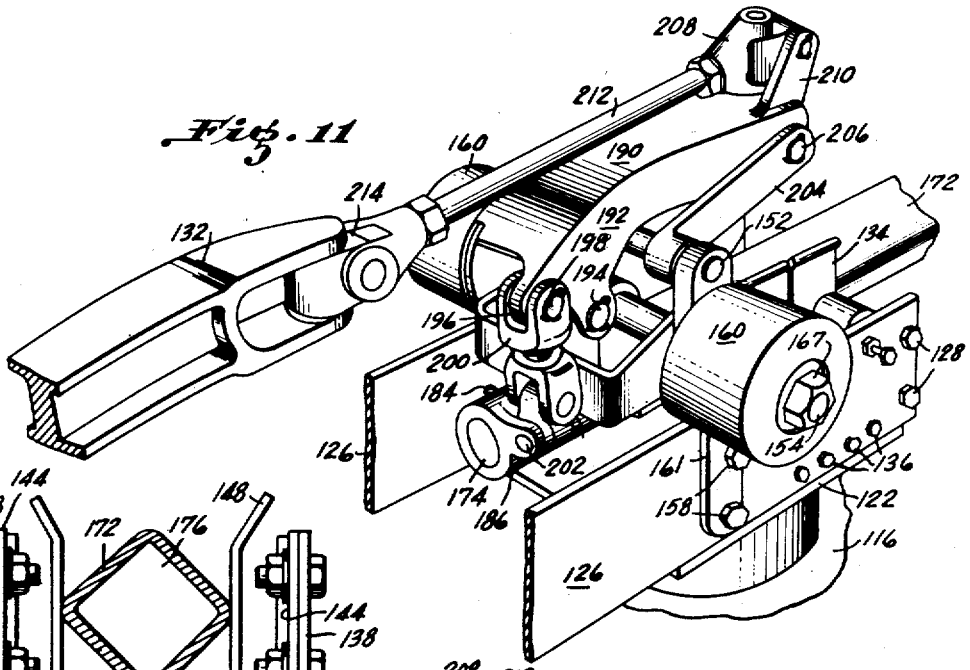
Fig. 11
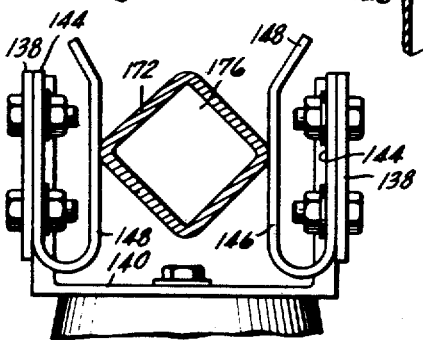
Fig. 13
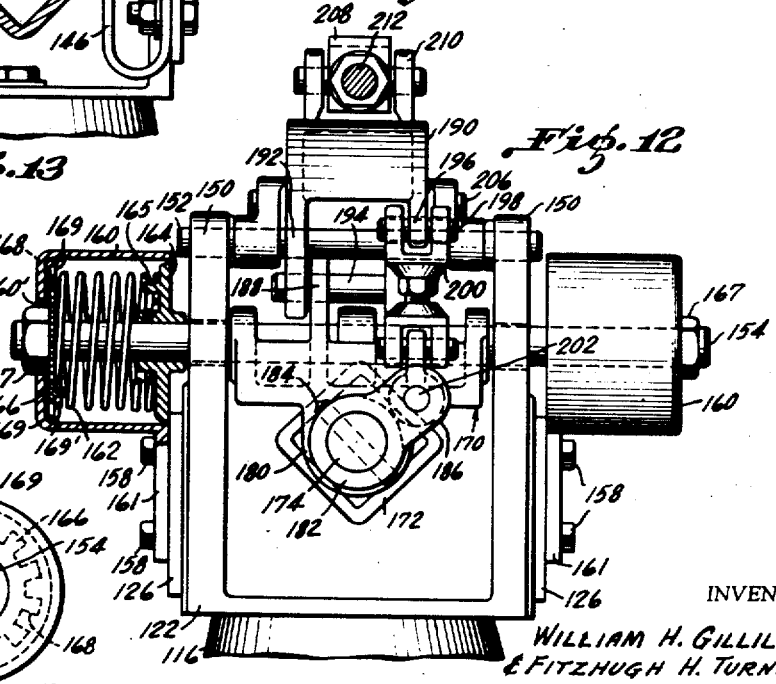
Fig. 12
Fig. 14
INVENTOR
WILLIAM H. GILLILAND
& FITZHUGH H. TURNHAM
BY
Sturck, Nolan & Diggins
ATTORNEYS United States Patent Office Re. 23,915

Reissued Dec. 28, 1954

23,915

HIGH-VOLTAGE SWITCH ASSEMBLY

William H. Gilliland and Fitzhugh H. Turnham, Birmingham, Ala., assignors to USCO Power Equipment Corp., Birmingham, Ala., a corporation of Alabama Original No. 2,575,707, dated November 20, 1951, Serial No. 137,618, January 9, 1950. Application for reissue November 10, 1952, Serial No. 319,804

20 Claims. (Cl. 200—48)

Matter enclosed in heavy brackets [ ] appears in the original patent but forms no part of this reissue specification; matter printed in italics indicates the additions made by reissue.

This invention relates to switch operating mechanism and more particularly to operating mechanism for high voltage electric switches of the twist blade type in which the switch blade is first moved to circuit closing position between opposed stationary contacts and then twisted or rotated about its longitudinal axis to develop a heavy frictional pressure of the blade with said contacts. Examples of such switches are disclosed in United States Patents 2,303,119 to Froland and 2,466,374 to Caldwell. The present invention, however, is directed to mechanical arrangements designed to improve the operation of such switches and adapted to better handle high amperage current.

It is the general object and purpose of the present invention to provide operating mechanism for switches of the above type which embodies a novel assembly of elements for maximum ease of operation of the switch blade, even under severe icing condition, and in which the several parts are so arranged that, after the switch blade is twisted to frictionally grip the contacts, the maximum pressure of the blade on said contacts will be maintained and release thereof by retroactive pressure forces of the contacts on said blade effectively prevented.

Another object is to provide operating means for a switch blade supported near one end for pivotal swinging movement and for rotational twisting movement about its own axis which comprises a motion transmitting rocker arm and separate blade lifting and twisting links, each pivotally connected at one end to the rocker arm, with the other end of the lifting link mounted on a pivot supported in fixed relation to the blade and the other end of the twisting link operatively connected to the blade to rotationally twist the blade only when positioned between the contacts, while the swinging movement of the switch blade is controlled by the lifting link.

The invention has for another object to provide an adjustable universal linkage connection between the rocker arm and switch blade, whereby the extent or amount of twisting motion transmitted to the blade may be exactly adjusted and controlled in accordance with the setting of the stationary contacts.

An additional object, in one embodiment of the invention, is to provide a pivotally mounted swingable support in which the switch blade is supported near one of its ends, with a rocker arm and twist transmitting linkage connected with said support and the adjacent end of the switch blade respectively at the same side of the pivotal axis of said support, whereby in the swinging movement of the blade from closed position the major portion of the blade swings upwardly about the pivotal axis of the support while the remaining portion of the blade and said linkage swing downwardly about said axis, to thereby partially counterbalance the weight of the blade.

An additional object of the invention resides in the provision of a switch blade of improved construction, with novel means for rigidly connecting an arcing horn to the free end of the blade on the center line thereof, so that, in the twisting movement of the blade, said horn will remain in contact with the spaced parts of stationary jaw members, the connection between the horn and blade providing increased thermal conductivity for the transmission of heat from the point of contact.

*Still another object of the present invention is to provide a twist blade operating linkage which is effective to itself predetermine the horizontal closed switch position of the switch blade.*

With the above and other objects in view the invention resides in the improved operating mechanism for electric switches of the twist blade type, and the construction and relative arrangement of its several parts, as will hereinafter be more fully described, illustrated in the accompanying drawings and subsequently incorporated in the subjoined claims.

In the drawings wherein we have disclosed several simple and practical embodiments of the invention and in which similar reference characters designate corresponding parts throughout the several views:

Figure 10 is a side elevation of a modified embodiment of the invention, designed for ultra-high voltages;

Figure 11 is a perspective view of the switch blade operating mechanism shown in Figure 10;

Figure 12 is an end elevation thereof partly in section;

Figure 13 is a detail vertical section taken substantially on the line 13—13 of Figure 10; and Figure 14 is an end elevation illustrating the spring adjustment.

Figure 1:
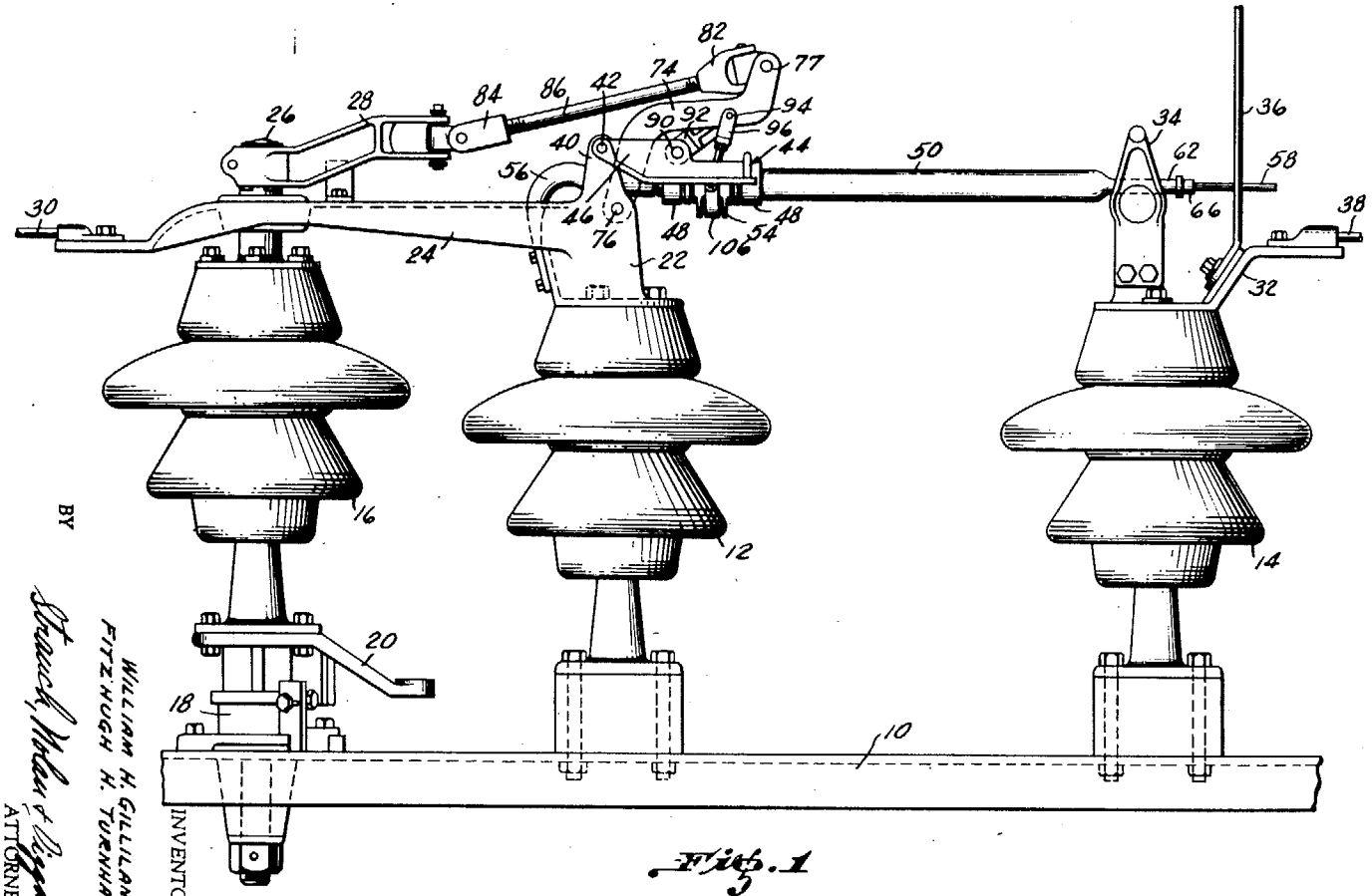
Figure 1 is a side elevation of an electric switch of the twist blade type provided with one embodiment of our improved operating mechanism.

Referring in further detail to the drawings, and for the present, more particularly to Figures 1 to 6 thereof, upon a base structure 10 spaced stationary insulators 12 and 14 respectively are rigidly mounted. In laterally spaced relation from the insulator 12 a rotary insulator 16 has a downwardly extending spindle rotatably supported in a suitable bearing 18 mounted on the base structure 10. Suitable operating means (not shown) is connected with the crank 20 which is rigidly fixed to the insulator 16.

The supporting casting 22 of electrically conductive metal, for the switch operating mechanism, is rigidly secured to the top of the stationary insulator 12 and is formed with a horizontally disposed arm 24 extending over the rotary insulator 16 and in which the top spindle 26 on said insulator is journalled. To this spindle one end of the crank arm 28 is securely fixed. The end of arm 24 projects laterally beyond the spindle 26 and to the same a conductor terminal 30 is connected in the usual manner.

Upon the other stationary insulator 14 an electrically conductive casting 32 is rigidly secured. Upon this casting a pair of vertically disposed opposed resiliently yieldable contact members, indicated at 34, are mounted. In rearwardly spaced relation from the contact members a pair of vertically disposed arcing horn jaw members 36 are also rigidly fixed to the casting 32 at their lower ends and beyond said jaw members the conductor terminal 38 is connected to the casting 32.

To the extent above described, the mounting and arrangement of the several parts is substantially in accordance with conventional practice. Our improved switch blade operating mechanism is operatively supported upon the casting 22. This casting is formed with upwardly projecting spaced side portions 40 which receive the pivot pins 42 swingably supporting the switch blade bearing structure 44 shown in Figure 6 of the drawings. As shown therein, this bearing structure comprises a one piece casting having parallel side portions 46 which are provided with openings at one end to receive the pivot pins 42 and are integrally connected by longitudinally spaced bearing portions 48 in which the switch blade 50 at one of its ends is rotatively supported. This switch blade is preferably formed from heavy gage cylindrical copper tubing and between the bearing portions 48 of the swingable structure 44 a collar 52 is rigidly fixed to the blade and is provided with a bifurcated lug 54 radially projecting outwardly and downwardly at one side of the collar. This rotatively supported end of the switch blade is connected by a flexible shunt 56 to the casting 22.

Figure 7:
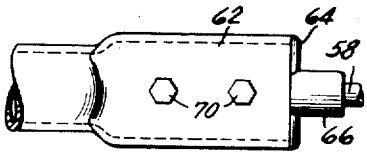
Figure 7 is an enlarged detail plan view of the arcing horn assembly on the free end of the switch blade.
Figure 8:
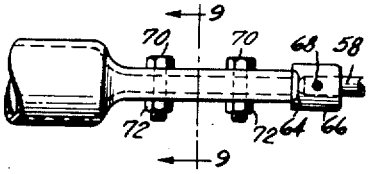
Figure 8 is a side elevation thereof.
Figure 9:
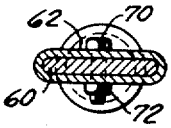
Figure 9 is a transverse sectional view taken on the line 9—9 of Figure 8.
Figure 6:
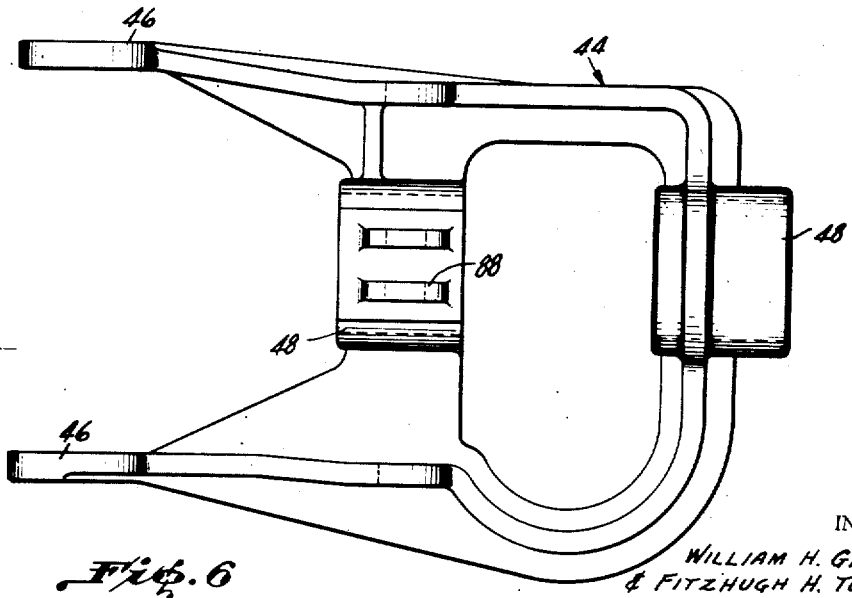
Figure 6 is a top plan view of the socket bearing structure for the switch blade.

The other or free end of the switch blade 50 carries an arcing horn 58 for engagement between and with the jaw members 36. Preferably, as shown in Figures 7, 8 and 9 of the drawings in order to obtain maximum thermal conductivity and transmission of heat from the point of contact between horn 58 and jaw members 36, we provide an elongated rectangular plate 60 upon which the end portion of the tubular switch blade is flattened or swaged, as indicated at 62. The plate 60 has a narrow end flange 64 abutting the end edge of the flattened tube section upon which a tubular boss 66 is centrally formed to receive one end of the arcing horn 58 which is rigidly secured against axial or rotative movement on the center line of the blade by a set screw 68. The plate 60 is rigidly secured against movement axially of the blade by means of the spaced bolts 70 having nuts 72 threaded thereon.

It will be seen from the above that the flattened end 62 of the switch blade is strongly reinforced by the plate 60 and the opposite side edges thereof maintained in the required predetermined spaced relation relative to the spacing between the contact members 34 so that the side edges of the switch blade, when in closed position, will have heavy frictional bearing contact with the members 34. The flattening or swaging of the end of the switch blade on the arcing horn plate 60 eliminates an extra joint in the path of the circuit and by reason of the large area of surface contact between the copper switch blade tubing and the plate 60 maximum thermal conductivity for the transmission of heat from the point of contact of arcing horn 58 with jaw members 36 is obtained. As the horn is accurately centered with respect to the blade it will remain in constant contact with jaw members 36 as the blade is twisted.

Upon one side portion of the casting 22 and below the pivot axis 42 of the bearing structure 44, a rocker arm 74 is supported at its lower end for pivotal rocking movement about the pivot pin 76. This rocker arm extends upwardly from pivot pin 76 between the side portions 46 of the bearing structure 44 and then rearwardly over said bearing structure, terminating in an upward extension 77. This rearwardly and upwardly extending portion of the rocker arm is integrally connected by a transverse web or top wall 78 with an opposite side portion 80 of similar shape or form. The free end of crank 28 is operatively connected with the upper end of the spaced side portions of rocker arm 74 by the universal joint units 82 and 84 and connecting rod 86.

The forward bearing portion 48 of the swingable bearing structure 44 is provided with an upwardly projecting apertured ear 88 in which one end of a pivot pin 90 is supported, the other end of said pin being supported in one side portion 46 of said bearing structure. On this pin the lower forward end of a [lifting] *control* link 92 is pivotally supported. This link extends upwardly and rearwardly between the side portions of rocker arm 74 with which the rear end of said link is pivotally connected by the pin 94 mounted at its ends in the side portions of the rocker arm.

Figure 4:
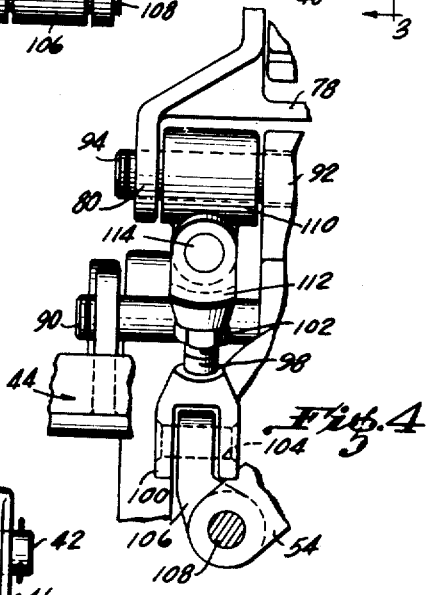
Figure 4 is a detail elevation showing a modification of the adjustable twist transmitting linkage.

The linkage for transmitting rotational or twisting movement to the switch blade 50 includes a bifurcated clevis member 96 pivotally connected with one end of the pin 94 and straddling one side portion of the rocker arm 74. This member 96 is connected by a threaded rod 98 with a similar threaded member 100, said members being adjusted and retained in spaced apart relation by a nut 102 on rod 98. Threaded member 100 is pivotally connected by pin 104 with the upper end of a link element 106 the lower end of which is pivotally connected with the bifurcated lug 54 on collar 52 by pin 108, it being noted that the axes of pins 104 and 108 are disposed at right angles to each other, thus providing a universal linkage connection with collar 52. A slight modification of the twist transmitting link is shown in Figure 4 of the drawings in which the clevis member 96 is replaced by a knuckle sleeve 110 mounted on the end of pin 94 between link 92 and side portion 80 of the rocker arm 74 and with this sleeve member 112 threaded on rod 98 is pivotally connected by pin 114 having its axis disposed at right angles to pin 94 and the pin 104 connecting member 100 to the link element 106. Thus a universal connection is also provided between the rod 98 and the rocker arm 74. It will of course be evident that a similar member 112 may be pivotally connected with member 96 in the arrangement shown in Figure 3 of the drawings.

By proper adjustment of this twist transmitting linkage the required amount of twist may be imparted to the switch blade in the movement of rocker arm 74 so that in the closed position of the switch blade the flattened end portion 62 thereof will be disposed in a plane substantially at right angles to the contact members 34 to exert the maximum frictional bearing pressure against said contact members.

Figure 2:
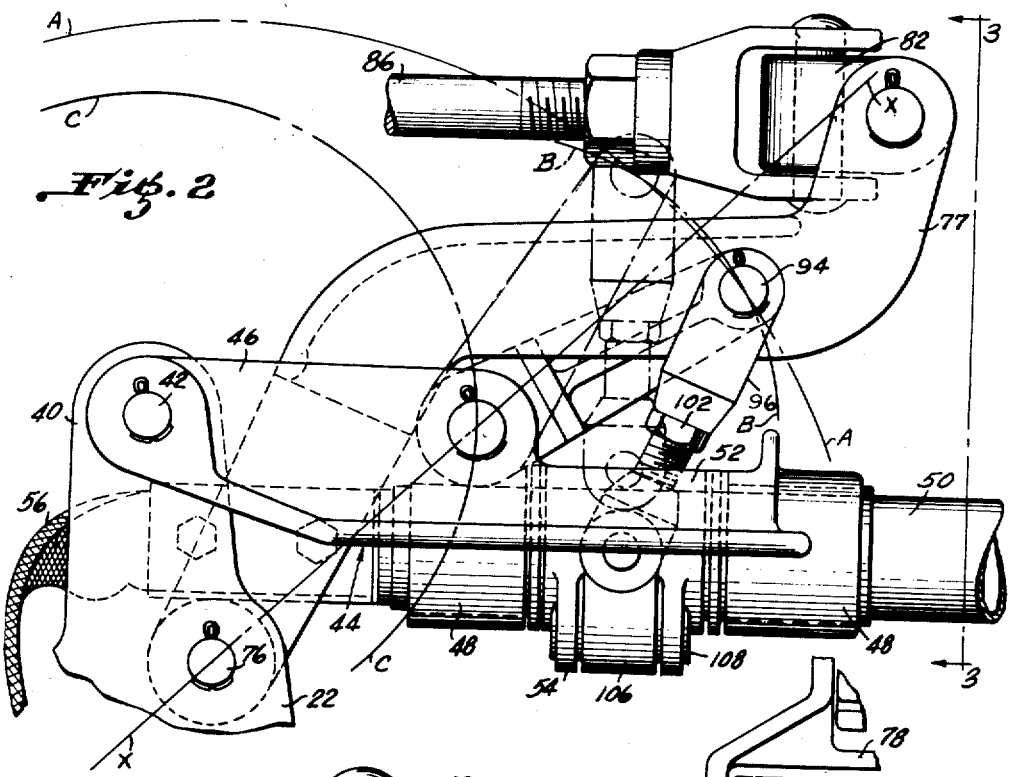
Figure 2 is a fragmentary side elevation on an enlarged scale, the switch blade being in its closed position, and the operating links illustrated by dotted lines in their relative positions after the switch blade has been twisted.
Figure 3:
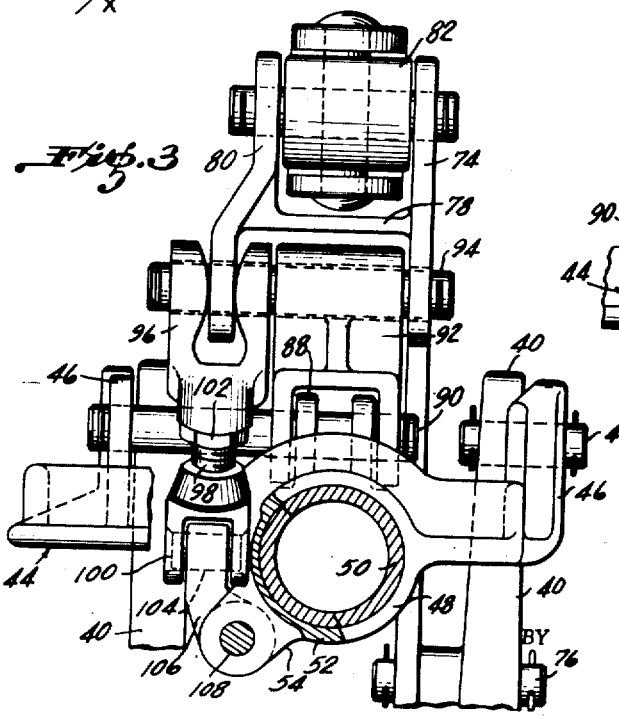
Figure 3 is a vertical sectional view taken substantially on the line 3—3 of Figure 2 showing the operating linkage in end elevation.

Referring now to Figures 1 and 2 of the drawings, it will be noted that the linkage pivots 90 and 94 are so located relative to the pivots 42 and 76 *that pivots 76 and 90 lie along an upwardly inclined centerline x extending from the axis of the fixed pivot 76 and containing the axis of pivot 90 while pivot 94 normally lies in the included angle between centerline x and a horizontal plane containing the axes of pivot 42 at the lowermost point of intersection of arcs A and B respectively generated around the axes of pivots 76 and 90. Since pivots 94 and 90 respectively carried by rocker arm 74 and bearing structure 44 are constrained to follow the eccentrically related arcuate paths A and C diverging in a clockwise direction and as the length of rigid control link 92 is such that the sum of the distance between pivots 76 and 90 and 90 and 44 equals the straight line distance between pivots 76 and 94 further clockwise movement of pivots 90 and 94 along their respective paths tends to lengthen rigid link 92, and pivot 90 is effectively suspended from pivot 94 without any tendency to move pivot 90 clockwise. Therefore, switch blade 50 is positively held against further clockwise movement around its pivot 42 and rocker arm 74 is positively held against further clockwise movement around its pivot 76. Thus the closed circuit position of the switch is automatically determined by the linkage system and the need for the customary limit stop heretofore provided on the switch contact members 34 in the prior art switch structures is unnecessary. This avoids objectionable arcing between the switch blade and such limit stops that often results in a welding of the blade to the stop and a field failure of such switches.*

*During initial counterclockwise movement of rocker arm 74 toward switch open position, pivot 94 swings in a counterclockwise direction along arc A and link 92 idly pivots around pivots 90 and 94, due to the normal running pivot clearances provided at the various pivots 42, 76, 90 and 94, until the pivot 94 reaches the upper point of intersection of arcs A and B. Since arcs A and C diverge in a clockwise direction and link 92 is free to pivot around pivots 90 and 94, counterclockwise movement of pivot 94 along arc A beyond the upper intersection point of arcs A and B occurs without binding of the linkage while maintaining link 92 under tension due to the changing slope of link 92. As a consequence, link 92 is maintained under tension at all times when it is not merely idling during movement of pivot 94 between the points of intersection of arcs A and B thereby effectively holding pivot 90 against a depressive movement which might create a locked linkage condition preventing opening movement of the switch.*

*This relationship of pivots 42, 76, 90 and 94 plays an important function in the switch of the present invention, since the rigid link 92 pivotally connecting pivots 90 and 94 functions, when pivot 94 moves counterclockwise in the region of centerline x, first as a mere idler connection between pivots 90 and 94 and then to merely support pivot 90 and the weight of blade 50, after it is twisted free of contacts 34, against clockwise rotation*

*around pivot 42 until pivot 94 moves to the upper intersecting point of arcs A and B vertically above pivot 104. At this time, links 102 and 106 which have up to this point been effective to merely raise pivot 108 and twist blade 50 as links 102 and 106 straighten out reach the straight line relationship and become effective to lift blade 50 as blade 50 and rocker arm 74 respectively pivot on the pivots 42 and 76* of the structure 44 and the rocker arm 74. [respectively, that in the initial portion of the upward swinging movement of the rocker arm the ends of the link elements connected with pivot 94 move upwardly along substantially the same arcuate path and, while]

*Since pivot 94 at no time during its movement between the points of intersection of the two arcs A and B moves inside or outside of the long arc A, there is, therefore, no effective force transmitted through the link 92 in its switch opening movement and switch closing movement during this increment of movement having a tendency to move the pivot 90 and the associated blade structure upwardly or downwardly. This is extremely important since the blade 50 and its bearing structure 44, during this increment of movement, should be and are merely maintained in proper horizontal contact engaging position so twisting of blade 50 to establish or release its high pressure contact can be properly effected.*

*This simple idling and supporting action of link 92 exists only so long as pivot 94 lies between the two points of intersection of arcs A and B. The linkage, however, does not interfere with counterclockwise rotation of the switch arm and linkage as a unit around pivot 42 upon counterclockwise movement of pivot 94 beyond the upper point of intersection of arcs A and B since arcs A and C approach one another and the pivotal connections between pivots 90, 94, 104 and links 92, 96, 98, 100 permit the linkage to fold upon itself as seen in dotted lines in Figure 2 and in Figure 5.*

Figure 5:
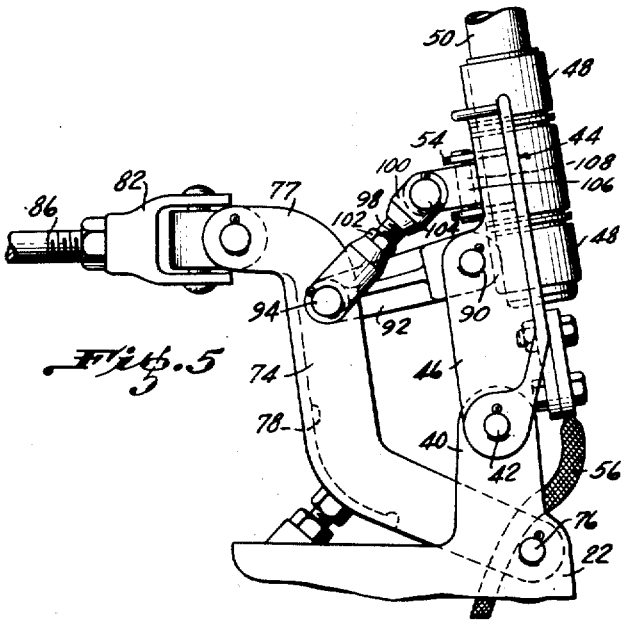
Figure 5 is a side elevation showing the switch blade in open position.

*While* the bearing structure 44 remains stationary, the twist transmitting linkage is pulled upwardly, thereby rotatively twisting the switch blade 50 [though substantially 90 degrees] to disrupt the frictional bearing pressure of the blade against contacts 34. *Further blade rotation moves* [and position] the flattened end 62 of the blade *to* [in substantially] a [vertical] plane *substantially 90 degrees offset from its closed position* between said contacts *during movement of blade 50 to its final open position (Figure 5) where the flattened end is finally disposed at an angle substantially less than its 90 degree position.* The relative angular positions of the lifting and twist transmitting links at *the beginning of swinging movement of blade 50* [this time] is illustrated in dotted lines in Figure 2. [In the further upward swinging movement of the rocker arm, this angular relationship of the links is maintained and the bearing structure 44 and the switch blade 50 are swung upwardly by link 92 about the pivotal axis of the bearing structure 44 to dispose the switch blade in open position, as shown in Figure 5 of the drawings.]

In the downward movement of rocker arm 74 from the position of Figure 5 to close the switch, the reverse of the above described operations occurs *and* [, without change in the angular relation of the lifting and twist transmitting linkage] bearing structure 44 and switch blade 50 are first swung downwardly about pivot 42 with the flattened end 62 of the blade disposed in [a vertical] *an angular* plane *with respect to its closed switch position* until said end of the blade is positioned between the spaced contact members 34. With the switch blade disposed in substantially a horizontal position, in the final portion of the downward movement of rocker arm 74 pivot 94 is moved downwardly *and outwardly* relative to pivot 90 *maintaining link 92 under tension and* [so that] a downward thrust is transmitted through the twist linkage to rotate the switch blade in bearings 48 through substantially 90 degrees whereby the opposite side edges of the flattened end portion 62 of the blade exert progressively increasing outward bearing pressure against the resilient contact members 34 until said end of the blade is disposed in substantially a horizontal plane between said contact members. The *control* [lifting] and twist transmitting linkage will then be again disposed in the relative angular positions shown in full lines in Figure 2, and it will be seen that in view of the relative positions of the linkage pivots 90, 94 and 104, maximum bearing pressure contact between the blade and the contacts will be maintained notwithstanding reactionary pressure forces by the contacts against the side edges of the end 62 of the blade tending to rotate the blade and release or diminish said bearing pressure.

Referring again to Figure 5 of the drawings, it will be noted that in the movement of the switch blade to closed position, the blade twisting linkage is disposed entirely outside of the lines of force transmitted by the operating connections with crank 28 through the rocker arm 74 and that this force is applied in a direct line substantially parallel with the path of movement of pivot 94 to the pivot 90 of the lifting link 92. Thus, there is no tendency to twist the switch blade until it reaches its closed position between the spaced contacts 34. This feature is of particular importance in the case of severe icing conditions.

The above described embodiment of our invention is designed primarily for use in connection with electrical circuits having a current carrying capacity of approximately 600 amperes. In Figures 10 to 13 of the drawings we have disclosed another embodiment of the invention intended for use more particularly in circuits having even higher current carrying capacities in the order of 2000 amperes, which will now be described in further detail.

In Figure 10 of the drawings the mounting and arrangement of stationary insulators 116 and 118 and the rotary insulator 120 is the same as that previously described. Upon the top of insulator 116 casting 122 is rigidly secured and provided at its opposite side edges and at one end thereof with upstanding portions 124 to which a pair of parallel copper bars 126 are securely bolted as at 128 at one of their ends. These bars extend forwardly at opposite sides of the rotary insulator 120 and are also rigidly bolted as at 130 to the bearing for the top spindle of said insulator, to the upper end of which a curved forwardly extending arm 132 is securely fixed.

To the inner face of each of the bars 126 above the insulator 116 a series of resilient contact members 134 are secured as at 136, the corresponding members in each of said series being arranged in opposed relation and extending above the bars 126.

Similar copper bars 138 are also secured to opposite side portions of the casting 140 rigidly fixed upon the top of insulator 118 and to the inner faces of said bars, opposed series of resilient contact members 142 are also secured in similar manner to the contacts 134. We have shown four contact members in each series, though it will be understood that a greater or less number may be used. While the contacts member 134 and 142 may be of any approved construction, in Figure 13 of the drawings we have shown a preferred U-shaped form of contact having one vertical resiliently yieldable leg 146 of the contact member extending upwardly in spaced relation to the fixed leg 144 and terminating at its upper end in an outwardly angled portion 148. It will be understood that normally the resiliently yieldable legs 146 of the opposed contacts extend upwardly in convergent relation to each other between the spaced bars 138. Optionally the U-shaped spring contact members 142 of Figure 13 may be reversed so that their rounded ends face upwardly and legs 146 project downwardly for certain switch blade associations.

The forward end of casting 122 is provided at opposite sides thereof with arms 150 extending upwardly above the bars 126 and contact members 134 and in the upper ends of these arms, the opposite ends of pivot rod 152 are mounted. Below this rod, a transverse shaft 154 is rotatably supported in the arms 150 with its opposite ends projecting outwardly above bars 126.

At each end of shaft 154 a housing 160, having a flange 161 secured to adjacent bars 126 by bolts 158, surrounds the shaft. A counterbalancing coiled torsion spring 162 is mounted in each housing. A plate 164, fixed to shaft 154 as by pin 163, closes the inner end of housing 160 and is formed with a projection 165 to which one end of spring 162 is anchored.

At the other end of each housing 160 an adjustment plate 166 having a hexagonal or other non-circular boss 167 projecting through an opening 160' in the housing so as to be available for manipulation by a tool is slidably mounted on shaft 154 and formed with a series of peripheral notches 168 adapted to coact with radial lugs 169 formed on the interior of housing 160. The outer end of torsion spring 162 is anchored to plate 166 at projection 169'.

The springs 162 resiliently resist rocking of shaft 154. When it is desired to vary the torsional resistance of rocking of the springs, the adjustment plate 166 is pushed in far enough axially to clear lugs 169, rotated by applying a wrench to boss 167 to wind or unwind the spring and then released to reengage with lugs 169.

Between the arms 150, a part of a switch blade bearing structure 170 is secured on shaft 154 as by pin 171. In this case, the switch blade is in the form of a rectangular copper tube 172 one end of which is closed by a member formed with a stud shaft 174 extending in coaxial relation with the switch blade. The other end of the tubular blade is closed by a plate 176 carrying the arcing horn 178 for engagement between the stationary jaw members (not shown), in the manner above described.

The bearing structure 170 below shaft 154 is formed with a bearing 180 in which the stud shaft 174 of the switch blade is journalled for free rotation. To the end of shaft 174 projecting beyond the bearing 180 a collar 182 is pinned or otherwise secured as at 184 and is provided with a radially disposed upwardly projecting bifurcated lug 186 at one side of the shaft axis.

The bearing structure 170 is also provided with integrally formed spaced arms 188 projecting upwardly above the shaft 154 to which the side flanges 192 of the rocker arm 190 are pivotally connected by the pin 194 supported at its opposite ends in the arms 188. One side flange of the rocker arm at its forward end is formed with an apertured ear 196 carrying the pivot pin 198 to which the upper end of the twist transmitting linkage 200 for the switch blade is connected. This linkage is substantially the same as that previously described and is connected at its lower end by pivot pin 202 to the bifurcated lug 186 of the collar 182.

The rocker arm 190 extends rearwardly from pivot pin 194 over the rod 152 and to the rear end of each side flange of the rocker arm, one end of a *control* [lifting] link 204 is pivotally connected as at 206. The other or forward end of each of these links is pivotally mounted on rod 152.

A universal joint unit 208 is connected with upwardly projecting spaced lugs 210 on the rear end of rocker arm 190, said unit being connected by the rod 212 with a similar universal joint unit 214 connected with the rear end of the curved arm 132 fixed to the upper end of the spindle of the rotary insulator 120.

When the switch blade 172 is in its closed position between the opposed contacts 134 and 142, one of the greater diameters of the rectangular blade is disposed in a plane at right angles to the contact members and the opposite corner edges of the blade have heavy frictional bearing pressure against the resilient legs 146 of the opposed contact members, as most clearly seen in Figure 13 of the drawings. *In the closed switch position of Figure 10, further clockwise rotation of the switch blade 172, as in the previously described embodiment, is prevented by the control link, in this case link 204. In this connection, it is to be noted that the rocker arm 190, the arm connected to the pull rod 212 and serving as the force applying arm of the linkage system, is pivotally supported on the pivot pin 194 carried by arms 188 of switch arm hinge or bearing structure 170 and that the linkage pivots 194 and 206, respectively corresponding to pivots 90 and 94, are so located relative to pivots 154 and 150 respectively, corresponding to pivots 42 and 76, that pivots 152 and 194 lie along an inclined centerline x' extending from the axis of the fixed pivot 152 downwardly to and containing the axis of pivot 194 while pivot 206, corresponding to pivot 94, normally lies in the angle opposite the included angle between centerline x and a horizontal plane containing the axis of pivot 154 at the point of intersection of arcs A and B, respectively corresponding to the first described arcs A and B and generated around the axes of pivots 152 and 194 respectively corresponding to the axes of pivots 76 and 90. It will be noted that because pivot 152 in this form of the invention is between pivots 194 and 206 rather than on the opposite side of pivot 194, the relationship of pivot 90 to pivots 76 and 94, the point of intersection of the arcs A and B occurs in the oppositely defined angle between centerline x' and the described horizontal plane to provide a true reversal of the pivot relationship of the first embodiment of the invention. Furthermore,*

*since pivots 206 and 194 respectively carried by the rocker arm 190 and bearing structure 170 are constrained to follow the eccentrically related arcuate paths A and C converging in a clockwise direction and as the length of rigid control link 204 is such that the sum of the distance between pivots 152 and 194 and 152 and 206 equals the straight line distance between pivots 194 and 206 further clockwise movement of pivots 194 and 206 along their respective paths tends to lengthen rigid arm 204, pivot 194 is again effectively suspended from pivot 206 substantially in the same fashion that pivot 90 is suspended from pivot 94. Therefore, switch blade 172 is positively held against further clockwise movement around its pivot 154 to automatically determine the closed circuit position of the switch.*

*Confirmation of the similarity of function between the two linkage systems described is forcefully illustrated by the fact that in each of the embodiments of the invention here disclosed the respective control links 92 and 204 of the two switch embodiments can be removed from the linkage system without eliminating sequential twisting and swinging of the switch blade. The only difference in operation of the switches with the control links out will be that the desired twisting and turning sequences of the switch blades will not take place, particularly in closing movement of the switch, at the predetermined desired angular positions of the switch blades along their paths of swinging movement and a closed switch positioning limit stop would have to be provided on the switch contact members 34 and 142 to assure proper closing of the switches.*

*Further describing the operation of the switch of Figures 10 through 14, upon* [Upon] rotation of the rotary insulator 120 to move the switch blade to open position rocker arm 190 is swung [upwardly] about pivot pin 194 in counterclockwise direction, link 204 swinging upwardly with the rocker arm about the stationary pivot 152. In the initial part of this movement of the rocker arm, a downward thrust is applied by the linkage 200 to collar 182, thereby rotating or twisting the switch blade 172 through substantially *45* [90] degrees to disrupt the frictional bearing contact of the switch blade against the stationary contact members and position opposite flat side faces of the blade between and substantially out of bearing contact with said members. Thus, in the further counter-clockwise movement of rocker arm 190 and link 204 about the fixed pivot rod 152 a downward thrust force is applied by the rocker arm upon pivot pin 194 forwardly of the supporting shaft 154 for the bearing structure 170 so that said bearing structure and the switch blade as well as linkage 200 are rocked about the axis of said shaft. The greater portion of the bearing structure 170 together with the twist transmitting linkage 200 and a part of the switch blade is thus swung downwardly about the axis of shaft 154 while the remaining part of the switch blade swings upwardly [and forwardly] *from* between the opposed contacts 134 and 142 to an open position, thus tending to partially counter-balance the weight of the switch blade.

In the movement of the switch blade 172 to its closed position, rocker arm 190 and links 204 first rock in clockwise direction about the axis of pivot rod 152 as a unit so that an upward force is applied by the rocker arm 190 to pivot pin 194, thereby swinging the switch blade 172 downwardly around shaft 154 without change in the angular relationship between the rocker arm and linkage 200 until the switch blade is disposed in substantially horizontal position between opposed contacts 134 and 142, when opposite flat surfaces of the blade will be opposed to the contacts and out of bearing engagement therewith. In the final portion of the clockwise movement of rocker arm 190 an angular movement of said rocker member relative to link 204 about the axis of the pivot rod 152 occurs and the rocker arm then pivots about the pin 194, thus applying a lifting force to the linkage 200 so that the switch blade 172 is rotated or twisted to the position shown in Figure 13 of the drawings to engage opposite corner edges of the blade on one of its longer diameters with high frictional bearing pressure against the opposed resilient contact elements.

From the above description and the accompanying drawings, it is thought that the construction, manner of operation and several advantages of the disclosed embodiments of the invention will be fully understood. In each of the operating mechanisms, it will be seen that we provide a novel arrangement of the linkage connections with the rocker arm so that the operating forces are most advantageously transmitted to the switch blade to obtain maximum ease of operation and the application of maximum pressure force by the switch blade to separate the opposed resilient contacts. In the assembly of the blade operating mechanism, by proper adjustment of the twist transmitting linkage, every blade will have exactly the required amount of twist, in accordance with the spacing of the opposed contact elements, to insure the application of maximum pressure force by said elements against the switch blade. Also in each case, the twist transmitting linkage is so arranged relative to the switch blade and the pivotal axis of the rocker arm as to effectively resist any tendency of the blade to be rotated about its axis while the switch is in closed position, by retroactive pressure force of the resilient contact elements against the switch blade.

It will further be noted that each of our novel switch operating mechanisms comprises a simple and compact assembly of a minimum number or structurally rugged elements, the reliable and efficient operation of which will not be impaired by severe icing conditions and which, in the event of serious damage, can be readily replaced at nominal expense.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an electric switch having a blade adapted to be twisted about its longitudinal axis and mounted on a pivoted support for movement therewith into and out of circuit closing position between a pair of opposed contacts spaced from said support; a motion transmitting arm mounted for rocking movement about a pivot axis in spaced parallel relation to the pivotal axis of said blade support, a first link mounted at one of its ends for swinging movement about a pivot supported in fixed relation to said blade and having a pivotal connection at its other end with said arm, a second link pivotally connected at one end with said arm, and means connecting said second link at its other end, in spaced relation from the fixed pivot of said first link, to said blade to impart an axial twisting movement to said blade in relative angular movement of said arm and links during initial rocking movement of said arm, when the blade is in closed position, to free said blade from frictional engagement with the contacts, and said first link thereafter controlling the swinging movement of the switch blade in the continued movement of said rocker arm.

2. Switch mechanism comprising a supporting member, opposed stationary contacts mounted in spaced relation to said supporting member to provide an open-ended blade receiving recess, a bearing structure pivotally mounted on said supporting member, a switch blade journalled in said bearing structure for rotational movement about its longitudinal axis and having portions of unequal cross sectional dimensions along different diameters, said blade, when in open position, being disposed with its smaller cross sectional dimension positioned in a plane for entry between said contacts, an actuating arm rockably mounted to swing bodily around a pivotal axis spaced from and parallel to the pivotal axis of said bearing structure, and at least one pair of links each having one end pivotally connected to said actuating arm and their other ends being respectively pivotally connected to said bearing structure and to said switch blade, all of said link pivots having axes parallel to and spaced from the pivotal axes of said arm and bearing structure, whereby upon rocking movement of said actuating arm in one direction, said switch blade will first be bodily swung about the pivotal axis of said bearing structure and positioned between said contacts and then rotated about its longitudinal axis to dispose opposite edges of a blade portion of major cross sectional dimension in frictional bearing engagement with said opposed contacts.

3. In an electric switch of the twist blade type having its blade mounted on a support for pivotal swinging movement into and out of engagement with a pair of opposed contacts; actuating mechanism comprising a first pivot having its axis disposed in spaced parallel relation to the pivotal axis of the switch blade, a motion transmitting arm supported for rocking movement about said first pivot, a second pivot having its axis disposed in spaced parallel relation to said first pivot and the pivotal axis of said switch blade, said first and second pivots being relatively movable, a first link having one end pivotally mounted on said arm and its other end connected to said second pivot, a second link having one end pivotally mounted on said arm, means pivotally connecting the other end of said second link to the switch blade to angularly twist said blade, said links and first and second pivots being so arranged that, upon rocking movement of said motion transmitting arm in one direction said twist blade is first moved to a closed position between said opposed contacts and is then bodily twisted around its longitudinal axis to establish high pressure circuit closing engagement of said blade with the opposed contacts, and upon rocking movement of said arm in the opposite direction, said blade is first twisted around its longitudinal axis to free the blade from circuit closing engagement with said contacts and is then swung about its pivotal axis to open position.

4. In an electric switch, an insulated contact, an insulated support spaced from said contact, a pivot mounted on said support, switch blade bearing structure swingable about said pivot, a switch blade rotatably journalled near one end in said structure and engageable near its other end with said contact, a second pivot spaced from and parallel to said first pivot in fixed relation to the switch blade, an actuating arm connected at one end for rocking movement about said second pivot, a third pivot mounted in fixed relation to the bearing structure and in spaced parallel relation to said first and second pivots, said second and third pivots being relatively movable about the axis of said first pivot, a *control* [lifting] link pivotally connected at one end to said arm and at its other end to said third pivot and operable in the rocking movement of said arm to swing said bearing structure and switch blade about the axis of said first pivot to and from circuit closing position with respect to said contact, and additional linkage operatively connecting said arm with said switch blade, angularly movable relative to said *control* [lifting] link during a portion of the rocking movement of said arm in each direction to rotate the blade about its longitudinal axis and establish or release circuit closing pressure engagement between the switch blade and contact.

5. An electric switch as defined in claim 4 wherein said *control* [lifting] link and additional linkage are swingable with the bearing structure relative to said first pivot.

6. An electric switch as defined in claim 4 wherein said third pivot is carried by said bearing structure for movement therewith relative to said first and second pivots.

7. An electric switch as defined in claim 6, wherein said *control* [lifting] link and additional linkage have a common pivotal connection with said actuating arm.

8. An electric switch as defined in claim 4, wherein said additional linkage connects the actuating arm adjacent to said second pivot to the end of the switch blade projecting beyond said bearing structure.

9. In an electric switch, a pair of opposed insulated contacts, an insulated support spaced from said contacts, a switch blade bearing structure mounted for swinging movement about a fixed pivot on said support, a switch blade rotatably journalled near one end in said structure and having a rectangular portion at its other end for movement to and from circuit closing position between said opposed contacts, an actuating arm mounted for rocking movement on said support about an axis in spaced parallel relation to the pivotal axis of said bearing structure, a lifting link pivotally connected at opposite ends to said actuating arm and bearing structure respectively to swing said bearing structure and switch blade to and from circuit closing position, a second link connected at one end to said actuating arm for angular movement relative to said first link, and means operatively connecting said second link with said switch blade, operative to rotate said blade when in circuit closing position to establish or release circuit closing pressure engagement between said rectangular portion of the blade and said opposed contacts.

10. An electric switch as defined in claim 9, wherein said last named means comprises relatively adjustable parts for determining the angular relation of said rectangular blade portion to the contacts when in circuit closing position.

11. An electric switch as defined in claim 9, wherein said first and second named links have a common pivotal connection with said actuating arm.

12. In an electric switch of the twist blade type, a tubular electrically conductive switch blade, actuating mechanism operatively connected with one end of said switch blade to swing the same about a fixed pivot axis and to rotate said blade about its longitudinal axis to establish and disestablish circuit closing engagement of said blade at its other end with opposed contact members, a rectangular arcing horn plate enclosed within the latter end of said tubular switch blade, said end portion of the blade being swaged or flattened upon said plate in intimate heat transmitting contact therewith and having a major cross sectional dimension exceeding the diameter of the remaining portion of the blade, an arcing horn, and means rigidly connecting said horn to said plate in coaxially centered relation with the switch blade.

13. In an electric switch, spaced pairs of opposed insulated contacts, a support, a switch blade bearing structure mounted for pivotal swinging movement on said support, a switch blade rotatably journalled near one end in said support and having rectangular portions for movement to and from circuit closing position between said opposed contacts, an actuating arm pivotally mounted at one end for rocking movement on said bearing structure, a fixed pivot on said support, a lifting link mounted at one end on said pivot and pivotally connected with the other end of said actuating arm, and means operatively connecting said actuating arm adjacent to its pivoted end to said switch blade at the opposite side of the pivotal axis of said bearing structure with respect to the pivotal connection between said lifting link and actuating arm, to rotate the switch blade when in circuit closing position between the opposed contacts and establish or release circuit closing pressure engagement between the rectangular portion of the blade and said contacts.

14. An electric switch as defined in claim 13, wherein said last named means comprises an adjustable linkage connection between said actuating arm and the end of the switch blade projecting beyond said bearing structure.

15. An electric switch as defined in claim 13, wherein the axis of said fixed pivot and the pivotal axis of said bearing structure are located in a common plane perpendicular to said support.

16. In an electric switch having a blade adapted to be twisted about its longitudinal axis and mounted on a pivoted support for movement therewith into and out of circuit closing position between a pair of opposed contacts; a motion transmitting arm mounted for rocking movement about a pivot axis in spaced parallel relation to the pivotal axis of said blade support, a pair of links having a common pivotal connection at one of their ends with said arm, means pivotally connecting the other end of one of said links with said pivoted support, and means pivotally connecting the other end of the other of said links with said blade, whereby in the rocking movement of said arm in one direction said links are independently actuated to first twist the blade and free the same from frictional engagement with said contacts and thereafter bodily swing said blade about the axis of said support to open-circuit position.

17. An electric switch as defined in claim 16, wherein said motion transmitting arm has a portion of channel form partially receiving and shielding the link connected with said support when the arm is in circuit closing position.

18. An electric switch as defined in claim 16 wherein the connecting means between said other link and said blade includes relatively adjustable parts operable to predetermine the degree of twist and the angular position of the blade relative to the contacts when the blade is in circuit closing position.

*19. In an electric switch of the twist blade type having an elongated, rotatable switch blade and a switch arm hinge journalling one end of said switch blade for rotation around its longitudinal axis and pivotably mounted on a support insulator for swinging movement around a hinge pin transversely disposed with respect to said longitudinal switch blade axis: an actuating linkage comprising an actuating arm pivotally mounted on said support insulator for swinging movement around a support pivot disposed in parallel relation to said hinge pin to one side of the longitudinal blade axis and having an arm portion normally located on the opposite side of the longitudinal switch blade axis adjacent the free end of said switch arm hinge; a support pin carried by said switch arm hinge between its ends and in parallel relation to said hinge pin in such position that lines extending from its axis respectively to the journal axis of said switch arm hinge and to the axis of said support pivot define between them an angle of 45°; a swing pin carried by said portion of said actuating arm in parallel relation to said hinge pin adjacent the free end of said switch arm hinge; rigid control link pivotally connected at one end to said support pin and pivotally connected at its other end to said swing pin and of a predetermined length such that the axis of said swing pin in the normal closed position of said switch blade coincides with the point of intersection nearest the switch blade of arcs respectively drawn with the axes of said support pivot and said support pin as centers and radii respectively corresponding to the straight line distance between said support pivot and said swing pin and the straight line distance between said support pin and said swing pin; and a collapsible blade twisting link directly interconnecting said switch blade and said actuating arm operable to rotate said switch blade during the predetermined increment of movement of said actuating arm required for said swing pin to move between said nearest point of intersection of said arcs to the other point of intersection of said arcs.*

*20. In an electric switch having a switch blade support structure comprising a support, a switch arm hinge hinged on said support and a switch blade rotatably journalled in said switch arm hinge, said switch arm hinge being arranged swingable in one direction of movement to swing said blade to switch closed position: an actuating mechanism comprising an arm hinged on said switch blade support structure, a blade twisting linkage directly interconnecting said switch blade and said arm arranged operable during a predetermined increment of moving of said arm to rotate said switch blade, and means to limit movement of said switch arm hinge and said actuating arm in said one direction of movement to thereby predetermine the amount of swing of said switch blade in said one direction of movement, said means comprising a rigid link of a predetermined length connected at one end to said actuating arm and at its other end to said switch blade support structure at a point such that the path of movement of said point of connection between said arm and said one end of said rigid link during said increment of movement of said arm follows an arcuate path lying substantially at a 45° angle to the axis of said switch blade when in closed position.*

References Cited in the file of this patent or the original patent

UNITED STATES PATENTS

| Number | Name | Date |
|---|---|---|
| 2,303,119 | Froland | Nov. 24, 1942 |
| 2,466,374 | Caldwell et al. | Apr. 5, 1949 |
| 2,521,484 | Schmidt | Sept. 5, 1950 |